Aug. 23, 1932.  L. HAISH ET AL  1,873,391
COUNTERBALANCED VEHICLE STORAGE ELEVATOR
Filed Feb. 4, 1929   2 Sheets-Sheet 2
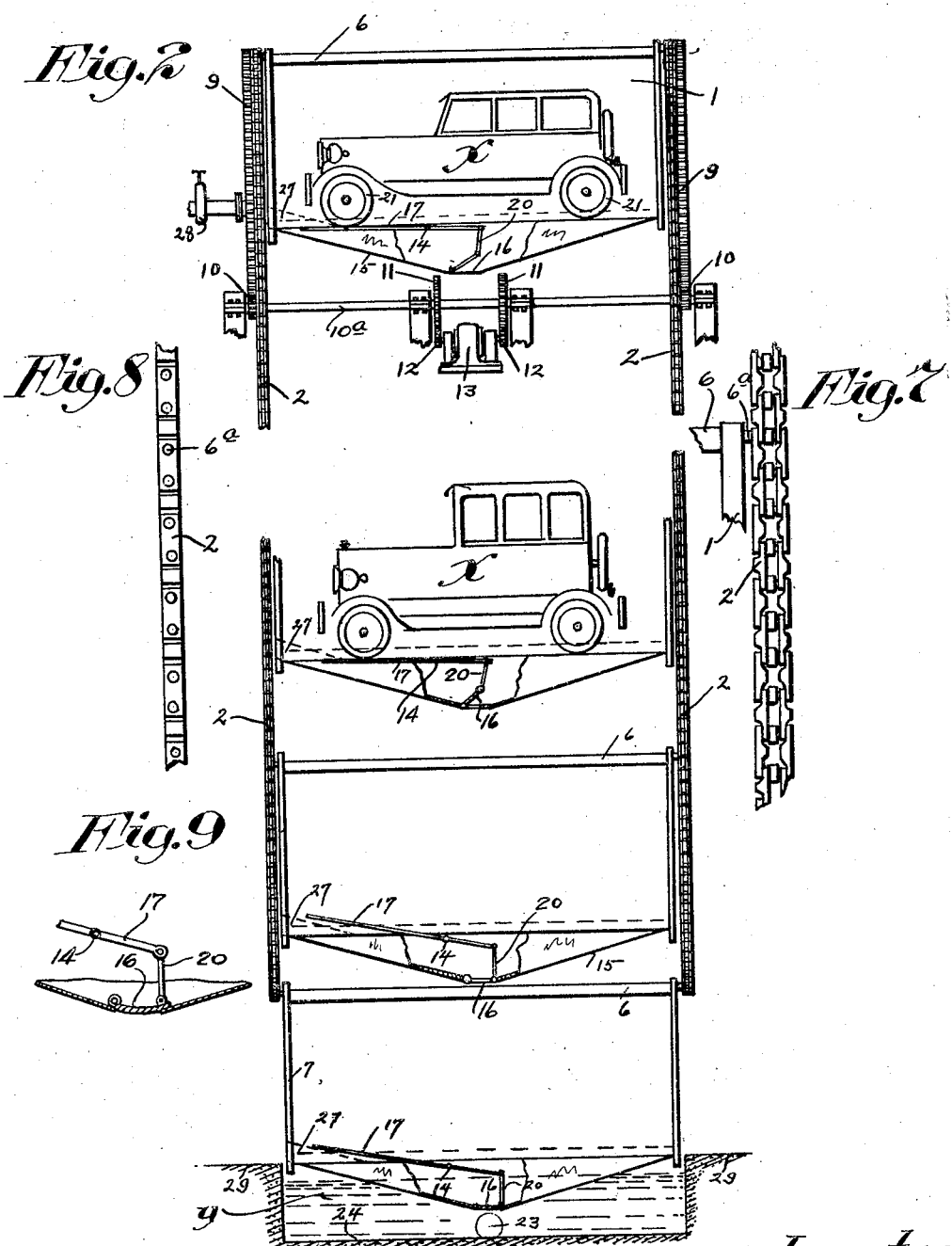

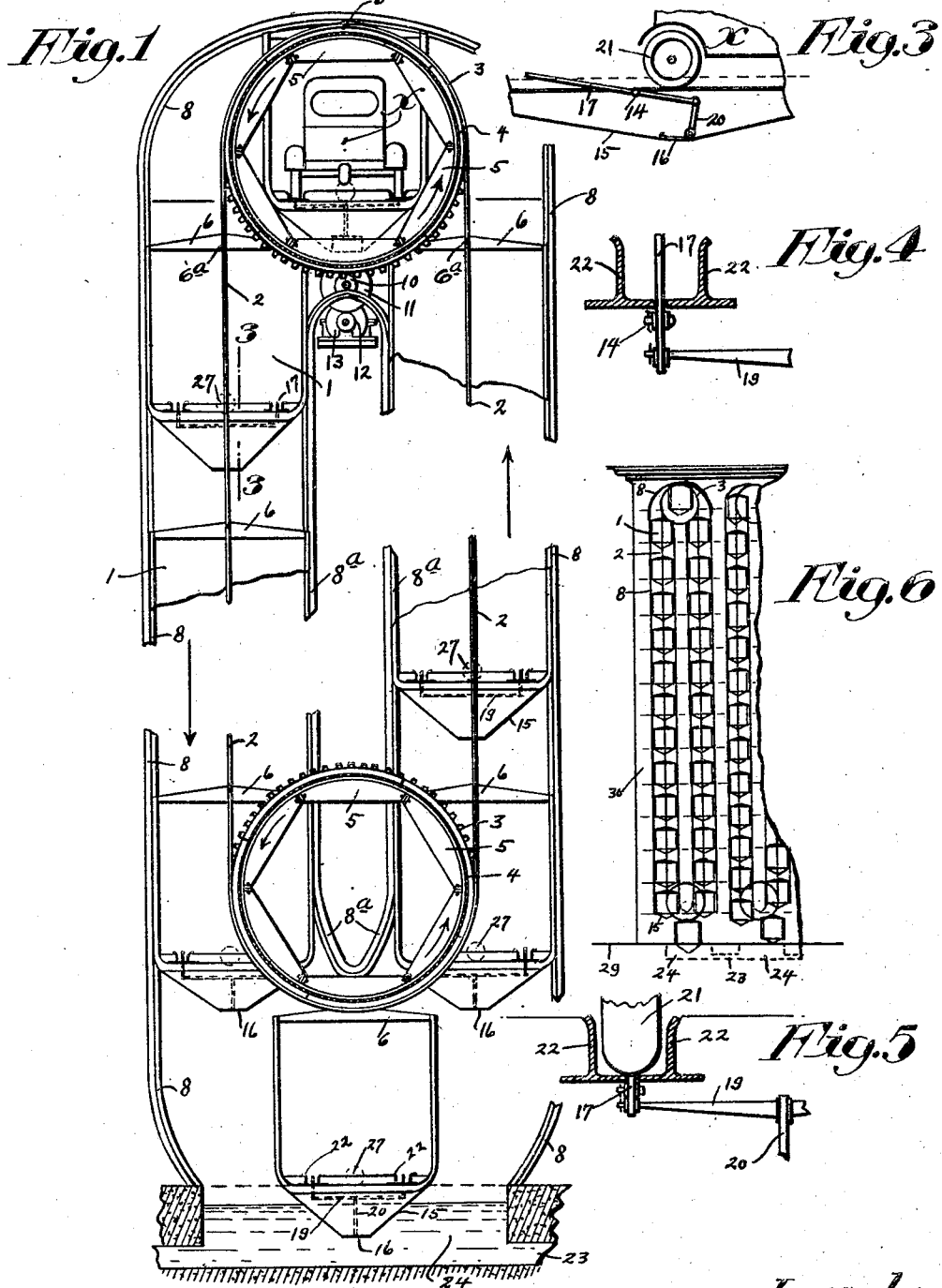

Patented Aug. 23, 1932

1,873,391

UNITED STATES PATENT OFFICE

LOUIS HAISH, OF ST. PAUL, AND FRANCIS M. HENRY, OF MINNEAPOLIS, MINNESOTA

COUNTERBALANCED VEHICLE STORAGE ELEVATOR

Application filed February 4, 1929. Serial No. 337,258.

Our invention relates to apparatus for the rapid handling and economic storage of automobiles and because of the character of the device it is herein designated as a vehicle storage elevator. It is a well known fact that the parking and storage of automobiles in large cities and congested districts has become one of the great problems and inasmuch as ground space in the congested districts of large cities is of great value, the number of cars that can be stored or parked on a given ground space, as well as the rapidity and amount of personal service required are items of greatest importance.

Our invention provides a storage apparatus in the nature of a storage elevator and in its preferred embodiment it comprises an endless travelling carrier operating as an elevator and equipped with pivotally suspended vehicle carriers in counterbalancing or counterpoising arrangement. Moreover, as a highly important feature, the vehicle carriers are provided with auxiliary counterbalancing devices in the form of water or liquid containers combined with a supply reservoir and with valve mechanism whereby the carriers that are not loaded with cars will take up and hold their counterbalancing load of water or liquid, but carriers loaded with cars will not take up or retain the counterbalancing liquid. The amount of liquid taken up and held is an auxiliary counterbalancing means that will be, as nearly as can be calculated, the average weight of various different cars that will be parked or stored. The storage elevator just above generally outlined has various other novel and important features and the advantages of the same which go beyond those just outlined will be more fully considered in the following description of the device illustrated in the accompanying drawings, wherein like characters indicate like parts throughout the several views.

Referring to the drawings:

Fig. 1 is a view partly in full front elevation and partly in diagram illustrating the improved storage elevator, some parts being broken away;

Fig. 2 is a view partly in full side elevation and partly in diagram and some parts broken away showing the mechanism illustrated in Fig. 1;

Fig. 3 is a fragmentary section taken approximately on the line 3—3 of Fig. 1;

Figs. 4 and 5 are fragmentary details in section illustrating the action of the counterpoised valve actuating mechanism;

Fig. 6 shows a part of a storage building equipped with several of the storage elevators, said parts being shown in diagram only;

Fig. 7 is an enlarged side elevation showing a part of one of the elevator chains or link belts;

Fig. 8 is a front elevation of a part of the chain shown in Fig. 7; and

Fig. 9 is an enlarged section of one of the valves and a portion of one of the counterpoising tanks diagrammatically shown in Fig. 2.

A plurality of cage-like vehicle carriers or carriages are pivotally suspended from a pair of very heavy laterally spaced parallel link belts or chains that run over large upper and lower sprocket wheels mounted in suitable bearings in upper and lower portions of a building structure. These carriers 1, as shown, are provided with heavy top beams 6 that are intermediately pivoted at 6ª to the heavy link belts or chains 2. These chains 2 run over large upper and lower sprocket wheels 3 that are of annular form and by roller-bearings 4 are journaled on large open bearing frames 5 that are rigidly secure to a suitable framework of a building structure 30. Throughout their vertical movements, the carriers 1 are held against oscillatory swaying movements by fixed upright guides 8 and 8ª. The carriers swing above and below the inner guide 8ª and move from one vertical line to another. When the arrangement is such as to receive cars at the ground floor and elevate the same, the cars will be driven onto and off from the carriers which are open at their front and rear ends while the carrier is in its lowermost position shown in Fig. 2. Here, however, it should be noted that the frames 5 and particularly the upper frame 5 has such open interior that an automobile can be driven through the same, and this permits cars to be taken off at an upper floor in the arrangement illustrated in the drawings or to be taken on or off onto the ground floor and lowered into pits or sub-storage spaces where the arrangement is as it may be for accomplishing basement or under-ground storage.

The annular upper sprockets 3 carry annular spur gears 9 which, as shown in Figs. 1 and 2, mesh with pinions 10 on a countershaft 10$^a$. The countershaft 10$^a$, as shown, carries spur gears 11 that mesh with spur pinions 12 driven by an electric motor 13. The vehicle carriers 1 on their floors are provided with channel-like wheel runways as shown, by slightly spaced inverted T-beams 22. When an automobile X is driven onto one of the carriers 1, its tires 21 will run in the channels formed by the beams 22 and the cars will thus be properly guided to balancing positions on the carriers, and moreover, the tires will be properly guided into engagement with levers 17.

Secured on the bottom of each vehicle carrier 1 is hopper-like liquid containers 15, which, when loaded with water or other liquid act as the auxiliary counterbalancing means above already referred to. The liquid containers 15, in their bottoms, have openings normally closed by gravity-seated valves 16 that rigidly open under upward pressure but will be pressed tightly closed by water pressure on the upper surfaces thereof.

Immediately below the elevator structure is a water supply tank 24 which receives water through a pipe or port 23 approximately to the level indicated by the dotted line marked $y$ on Fig. 2, and by reference to this view it will be noted that when the vehicle carrier is in its lowermost position, its liquid container 15 will be immersed in the liquid of said tank. When a liquid container is thus immersed, the pressure of the water in the supply tank will force valve 16 open so that the water will flow freely into the container in an amount which, already indicated, will be sufficient approximately to counterbalance or offset a car of average weight. The free edges of the valve 16 are connected by links 20 to an equalizing bar 19, the ends of which are attached to the lower ends of the levers 17 that are intermediately pivoted to the bottom of the respective vehicle carriers 1. The upper ends of the levers 17 normally project up through the slots formed between the channel-forming beams 22, as diagrammatically shown in Fig. 2. With this arrangement, therefore, when a vehicle carrier is moved to its lowermost position, its liquid container will be filled or loaded with water, and if no vehicle is run onto the carrier, its valve 16 will, when the carrier is raised, tightly close and hold the water within the container to offset the absent vehicle. If, however, a vehicle is run onto the carrier while it is in its lowered position, its front tires will depress the upwardly projecting ends of the two levers 17, thereby positively opening valve 16 so that when the carrier loaded with a vehicle is raised, the water from the container will run back into the supply tank or, otherwise stated, said container will automatically be unloaded of its counterbalancing liquid.

The runway or street level is indicated in Fig. 2 by the numeral 29 and in the same figure the numeral 27 indicates pipes carried by the liquid containers 15 and arranged to be engaged with a valve-equipped water supply pipe 28 at the extreme uppermost position on the elevator. These pipes are provided to supply water at the head or top of the elevator to compensate for the weight of a car that may be removed at the uppermost floor or elevation. In Fig. 1, a car or vehicle is positioned in its uppermost position and in this position it will be seen that the automobile will be run through the upper frames 5 and hence can be taken off from the elevator and replaced on the elevator at will, providing, of course, there is an upper floor to receive the same.

As advantages gained by the above described automobile storage structure, the following items are particularly mentioned, to wit: First, saving in space; second, saving in first cost of the structure; third, reduction of amount of labor required in handling cars, fourth, speed in which cars may be stored and delivered; fifth, elimination or great reduction of gases in the interior of the building; and sixth, reduction of the amount of heat required to heat the building at the proper temperature, due to the fact that less ventilation or interchange of air is required to keep the building substantially free from gas.

In a building installed with these storage elevators, one attendant can operate quite a large number of elevators carrying several hundred cars, and no attendent is required to drive the car onto or off from the elevator for the owner of the car can readily drive the car onto the elevator and there leave it, and when he calls for it, the elevator operator simply brings the car to the proper floor level and the owner steps into the car and drives away. With properly arranged driveways between the series of elevators, an automobile can be driven into a vehicle carrier and then removed by driving straight ahead out of the carrier.

In view of the fact that the vehicle carriers whether loaded with cars or not, are substantially counterbalanced on the opposite sides of the elevator, it, of course, follows that comparatively little time would be required to move the elevator with its load of cars. Moreover, the motor with its transmission mechanism, of course, operates as a speed controller and the only work that it has to perform is to overcome friction and small discrepancy in counterbalance.

From the foregoing it is obvious that the term "elevator belt" is herein used in the broadest kind of a sense to include any kind of belt-like elevating means whether in the form of chains and cables, link belts and the like.

What we claim is:

1. A vehicle storage elevator comprising an endless travelling elevating means equipped with pivotally suspended vehicle carriers in counterbalancing arrangement, and counterbalancing means adapted to be applied to the several carriers and operative to substantially offset the weight of a vehicle on any carrier to which a vehicle is not applied, combined with automatic means for rendering said counterbalancing means operative when a carrier passes a predetermined point in unloaded condition.

2. A vehicle storage elevator comprising spaced elevator belts combined with guiding and driving means therefor, vehicle carriers pivotally suspended from said elevator belts in counterbalancing arrangement, guides for preventing oscillation of said carriers while moving downwardly, and counterbalancing means adapted to be applied to the several carriers to substantially counteract the weight of a vehicle on any carrier to which a vehicle is not applied, combined with automatic means for rendering said counterbalancing means operative when a carrier passes a predetermined point in unloaded condition.

3. A vehicle storage elevator comprising an endless travelling elevating means equipped with pivotally suspended vehicle carriers in counterbalancing arrangement, a liquid-containing counterbalancing receptacle on the bottom of each vehicle carrier, a liquid supply tank below the elevator, into the liquid of which the liquid containers on the several carriers will be immersed when lowered, and valves in the bottoms of said liquid containers which, when closed, hold the counterbalancing liquid in said containers, but which, when opened, permit flow of the liquid from said supply tank into said containers and conversely.

4. A vehicle storage elevator comprising an endless travelling elevating means equipped with pivotally suspended vehicle carriers in counterbalancing arrangement, a liquid-containing counterbalancing receptacle on the bottom of each vehicle carrier, a liquid supply tank below the elevator, into the liquid of which the liquid containers on the several carriers will be immersed when lowered, valves in the bottoms of said liquid containers which, when closed, hold the counterbalancing liquid in said containers, but which, when opened, permit flow of the liquid from said supply tank into said containers and conversely, and valve-actuating means applied to said carriers and including a member arranged to be engaged and depressed to open the valve of the respective container when a vehicle is on the corresponding carrier.

5. The structure defined in claim 4 in which the valves of said containers will automatically open under pressure of liquid from a supply tank that will close under pressure from liquid in the container.

6. The structure defined in claim 4 in which the valves of said containers will automatically open under pressure of liquid from a supply tank that will close under pressure from liquid in the container, and in which the depressible member of said valve actuator is arranged to be engaged by the wheel of the vehicle on the carrier to hold the valve open for the discharge of counterbalancing liquid from the container under upward movement of the carrier having a vehicle thereon.

7. A vehicle storage elevator comprising upper and lower pairs of large aligned sprockets, parallel link belts running over the aligned upper and lower sprockets, vehicle carriers pivotally connected at their upper portions to said link belts in counterbalancing arrangement, liquid containers applied to the bottoms of said carriers, a liquid supply tank below said elevator into the liquid of which the containers of said carriers will be immersed when lowered, valves in the bottoms of said containers arranged to be opened by pressure from the supply tank and to be closed by pressure from the container, and valve-actuating devices including elements arranged to be engaged by the wheel of the vehicle on the carrier to hold said respective valve open for the discharge of counterbalancing liquid from the container under upward movement of the container having a vehicle thereon.

8. The structure defined in claim 4 in which the valves of said containers will automatically open under pressure of liquid from a supply tank that will close under pressure from liquid in the container, and in which the depressible member of said valve actuator is arranged to be engaged by the wheel of the vehicle on the carrier to hold the valve open for the discharge of counterbalancing liquid from the container under upward movement of the carrier having a vehicle thereon, the said vehicle carriers being open at their ends for the movement of vehicles thereonto and therefrom endwise in the direction of the pivotal connections between the carriers and belts.

9. The structure defined in claim 4 in which the valves of said containers will automatically open under pressure of liquid from a supply tank that will close under pressure from liquid in the container, and in which the depressible member of said valve actuator is arranged to be engaged by the wheel of the vehicle on the carrier to hold the valve open for the discharge of counterbalancing liquid from the container under upward movement of the carrier having a vehicle thereon, the said carriers being open for the movement of vehicles thereonto and therefrom endwise thereof and while moved to a position below the link belts that carry the same.

10. The structure defined in claim 4 in which the valves of said containers will automatically open under pressure of liquid from a supply tank that will close under pressure from liquid in the container, and in which the depressible member of said valve actuator is arranged to be engaged by the wheel of the vehicle on the carrier to hold the valve open for the discharge of counterbalancing liquid from the container under upward movement of the carrier having a vehicle thereon, the bearings for said sprocket wheels being in the form of open frames through which a vehicle may be moved onto or from a respective carrier.

11. A vehicle storage elevator comprising endless travelling elevating means equipped with suspended vehicle carriers in counterbalancing arrangement, vehicle counterbalancing means arranged to be picked up by said vehicle carriers when and only when passing the loading point unloaded with a vehicle.

12. A vehicle storage elevator comprising endless travelling elevating means equipped with suspended vehicle carriers in counterbalancing arrangement, vehicle counterbalancing means arranged to be picked up by said vehicle carriers when and only when passing the loading point unloaded with a vehicle, said counterbalancing means including a liquid-containing counterbalancing receptacle on each vehicle carrier, a supply tank at the loading point into which the receptacles on said vehicles will be immersed at the loading point, and car-actuated valve mechanism arranged to close and retain the counterbalancing liquid when a car is not on the vehicle carrier, but to open said valve mechanism when a car is on said vehicle carrier.

In testimony whereof we affix our signatures.

LOUIS HAISH.
FRANCIS M. HENRY.